(12) United States Patent
Heim et al.

(10) Patent No.: US 6,178,618 B1
(45) Date of Patent: *Jan. 30, 2001

(54) METHOD FOR CONSTRUCTING A PIVOT CARTRIDGE ASSEMBLY FOR A DISC DRIVE

(75) Inventors: Matthew Robert Heim, Ventura; Richard Gene Krum, Thousand Oaks, both of CA (US)

(73) Assignee: Seagate Technology LLC, Scotts Valley, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/140,881

(22) Filed: Aug. 27, 1998

(51) Int. Cl.[7] .................................................. G11B 5/127
(52) U.S. Cl. ................. 29/603.03; 29/469.5; 360/99.08; 360/98.07; 310/67 R
(58) Field of Search ........................... 29/603.03, 603.01, 29/469.5, 593, 513.13, 844, 596, 447; 360/104, 105, 106, 107, 99.08, 98.07, 596, 447; 310/67 R, 90

(56) References Cited

U.S. PATENT DOCUMENTS

| | | | |
|---|---|---|---|
| 2,504,284 | * 4/1950 | Voigt | 308/76 |
| 4,716,483 | * 12/1987 | Walsh | 360/106 |
| 4,754,353 | * 6/1988 | Levy | 360/106 |
| 5,099,374 | * 3/1992 | Ohkita et al. | 360/106 |
| 5,265,325 | * 11/1993 | Fortin | 29/742 |
| 5,491,598 | * 2/1996 | Stricklin et al. | 360/106 |
| 5,600,516 | * 2/1997 | Phillips et al. | 360/105 |
| 5,628,571 | * 5/1997 | Ohta et al. | 384/518 |
| 5,654,849 | * 8/1997 | Hassibi et al. | 360/98.07 |
| 5,666,242 | * 9/1997 | Edwards et al. | 360/106 |
| 5,732,458 | * 3/1998 | Moir et al. | 29/603.03 |
| 5,801,902 | * 9/1998 | Koeppel et al. | 360/99.08 |
| 5,842,270 | * 12/1998 | Tucker et al. | 29/705 |
| 5,857,780 | * 1/1999 | Newberg et al. | 384/206 |
| 5,978,180 | * 11/1999 | Lee et al. | 360/106 |
| 5,995,322 | * 11/1999 | Yanagihara | 360/97.01 |
| 6,018,441 | * 1/2000 | Wu et al. | 360/106 |
| 6,041,488 | * 3/2000 | Wang | 29/603.03 |

* cited by examiner

Primary Examiner—Lee Young
Assistant Examiner—Minh Trinh
(74) Attorney, Agent, or Firm—Merchant & Gould P.C.

(57) ABSTRACT

The specification discloses a preferred system, apparatus, and method for constructing a pivot cartridge assembly. The preferred embodiment of the present invention involves the following steps. A pivot bearing and an actuator assembly are provided. The actuator assembly has an aperture for receiving the pivot bearing. The actuator assembly is heated until the aperture of the actuator assembly expands to accommodate the pivot bearing. The pivot bearing is inserted into the aperture of the heated actuator assembly. When the actuator assembly cools, the aperture of the actuator assembly thermodynamically contracts and constricts around the pivot bearing, locking the bearing in place. As a result, the actuator assembly and pivot bearing behave as a single rigid unit.

9 Claims, 5 Drawing Sheets

METHOD FOR CONSTRUCTING A PIVOT CARTRIDGE ASSEMBLY FOR A DISC DRIVE

BACKGROUND OF THE INVENTION

1. Field of the Invention

The present invention relates, generally, to a data storage system, and in particular embodiments to a system, apparatus, and method for constructing a pivot cartridge assembly in a hard disc drive.

2. Description of Related Art

Modern computers employ various forms of data storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material, optical disc drives which employ recording discs that have optically readable recording material, magneto-optical (MO) disc drives which employ recording discs that have optically readable magnetizable recording material, or the like.

Within the disc drive system, one or more discs are rotated at a constant speed by a spindle motor. The data is stored on a plurality of tracks defined on the surface of the disc. As the discs rotate, actuator arms fixedly mounted on a pivot cartridge assembly move the electromagnetic heads from track to track under the control of a voice coil motor. Typically, the pivot cartridge assembly is supplied as a unitary component that is usually mounted onto the base of a disc drive. The actuator arms are supported from the pivot cartridge assembly and extend from the pivot cartridge assembly toward the disc.

The pivot cartridge assembly has a pivot bearing about which the actuator arms rotate. The pivot bearing is inserted into an aperture formed in the pivot cartridge assembly and is locked in place by a screw and glue. When coupled in this manner, the cartridge assembly and pivot bearing can exhibit some inter-component movements due to, for example, the difference in size of the aperture in the pivot cartridge relative to the pivot bearing diameter. In this manner, this locking technique can result in adverse vibrational movements of the pivot cartridge and pivot bearing, which can cause track misalignment problems.

More particularly, to allow the insertion of the pivot bearing into the pivot cartridge's aperture, the aperture's diameter must be larger than the bearing's diameter. During a disc drive's operation, the pivot bearing has a tendency to move or vibrate within the aperture. Such vibrations can cause the actuator arms to vibrate, preventing the alignment of the heads with the tracks. Additionally, the use of glue can cause outgassing. Outgassing can result in the formation of outgassed material deposits on disc and/or head surfaces which can interfere with the proper functioning of the head-disc interface.

Thus, there is a need in the art for a method of constructing a pivot cartridge assembly without the need for a screw and glue.

SUMMARY OF THE DISCLOSURE

To overcome the limitations in the prior art described above, and to overcome other limitations that will become apparent upon reading and understanding the present specification, the specification discloses a preferred system, method, and apparatus for constructing a pivot cartridge assembly.

The preferred embodiment of the present invention involves the following steps. A pivot bearing and an actuator assembly are provided. The actuator assembly has an aperture for receiving the pivot bearing. The actuator assembly is heated until the aperture of the actuator assembly expands to accommodate the pivot bearing. The pivot bearing is inserted into the aperture of the heated actuator assembly.

When the actuator assembly cools, the aperture of the actuator assembly thermodynamically contracts and constricts around the pivot bearing, locking the bearing in place. As a result, the actuator assembly and pivot bearing have characteristics of a single rigid unit. An advantage of an embodiment of the present invention is to prevent pivot bearing vibrations during disc drive operation and improve the overall performance of the disc drive. A further advantage of an embodiment of the present invention is ease of manufacture.

BRIEF DESCRIPTION OF THE DRAWINGS

Referring now to the drawings in which like reference numbers represent corresponding parts throughout.

DETAILED DESCRIPTION OF PREFERRED EMBODIMENTS

Overview

Preferred embodiments of the present invention relate to system, apparatuses, and methods for constructing a pivot cartridge assembly in a hard disc system without the need for a screw and glue.

Hardware Environment

Figure 1:
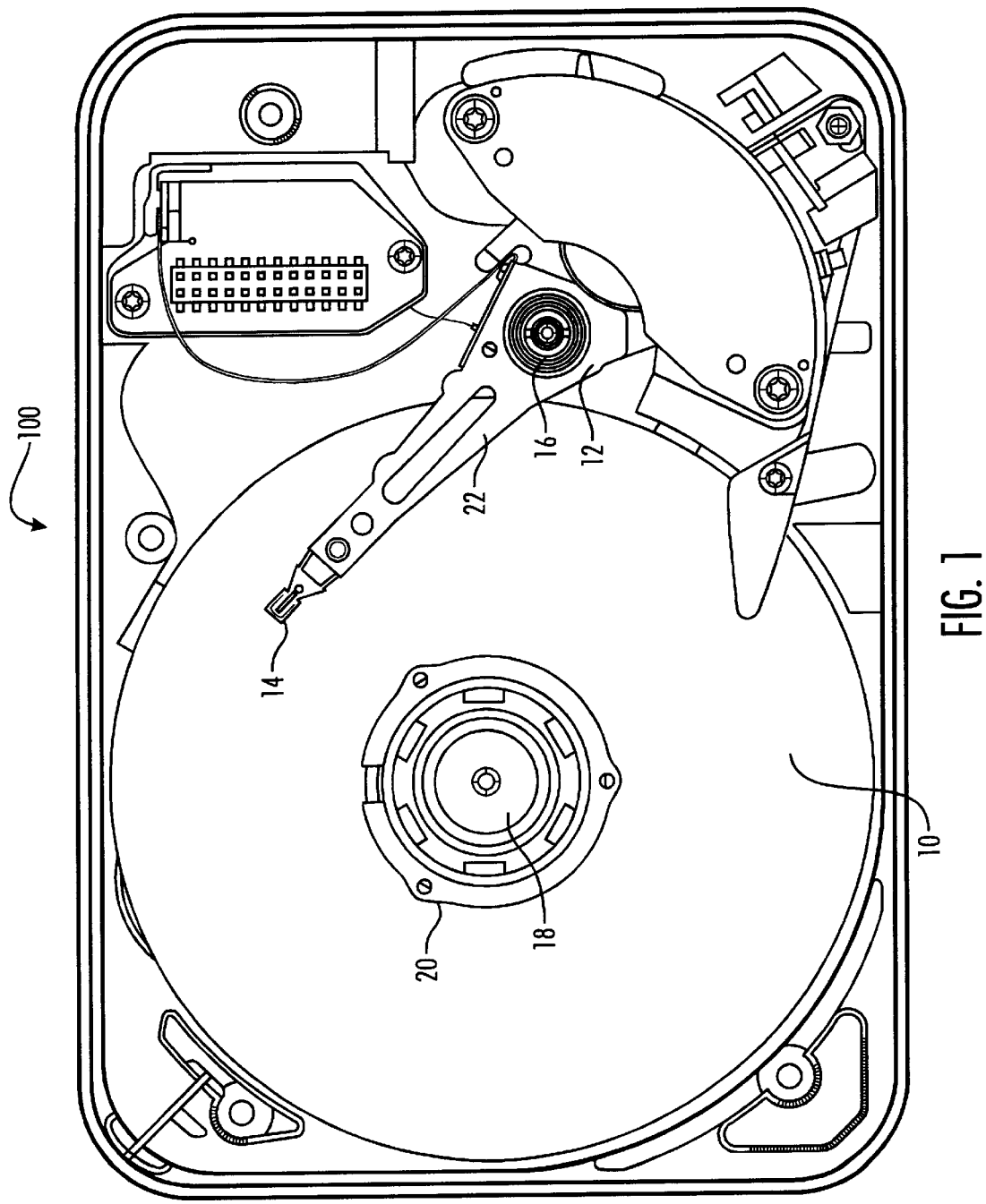
FIG. 1 illustrates an exemplary hard drive system used to implement a preferred embodiment of the present invention.

FIG. 1 illustrates an exemplary hard disc drive system that could be used to implement embodiments of the present invention. In the exemplary environment, a hard disc drive system 100 has at least one storage medium 10, an actuator assembly 12, a head 14, and a spindle motor (not shown). The actuator assembly 12 is pivotally mounted to a pivot cartridge assembly 16. The storage media 10 are clamped onto a shaft 18 of a spindle motor by a spacer bushing 20. The bushing 20 is rotatable with the storage media 10 and the shaft 18 of a spindle motor which drives the stack of storage media 10 in unison.

The actuator assembly 12 has an arm assembly 22 that extends adjacent and within the stack of storage media 10. The arm assembly 22 supports electromagnetic heads 14, which are capable of reading and writing data on the respective storage media 10. Reading and writing occurs when the actuator assembly 12 moves and positions the heads 14 adjacent appropriate track locations. In the embodiment shown in FIG. 1, the storage media 10 includes magnetic recording discs. However, other embodiments may employ alternative forms of storage media 10 that operate with heads 14, including but not limited to, optical media, magneto-optical media and the like.

In the illustrated embodiment of FIG. 1, the storage media 10 are in the form of multi-track magnetic recording discs.

Each disc has two recording surfaces (double sided) on which data may be written and/or read by the associated head 14. However, storage media 10 may be any suitable data storage device, including but not limited to single sided storage devices.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Constructing a Pivot Cartridge Assembly

Figure 2:
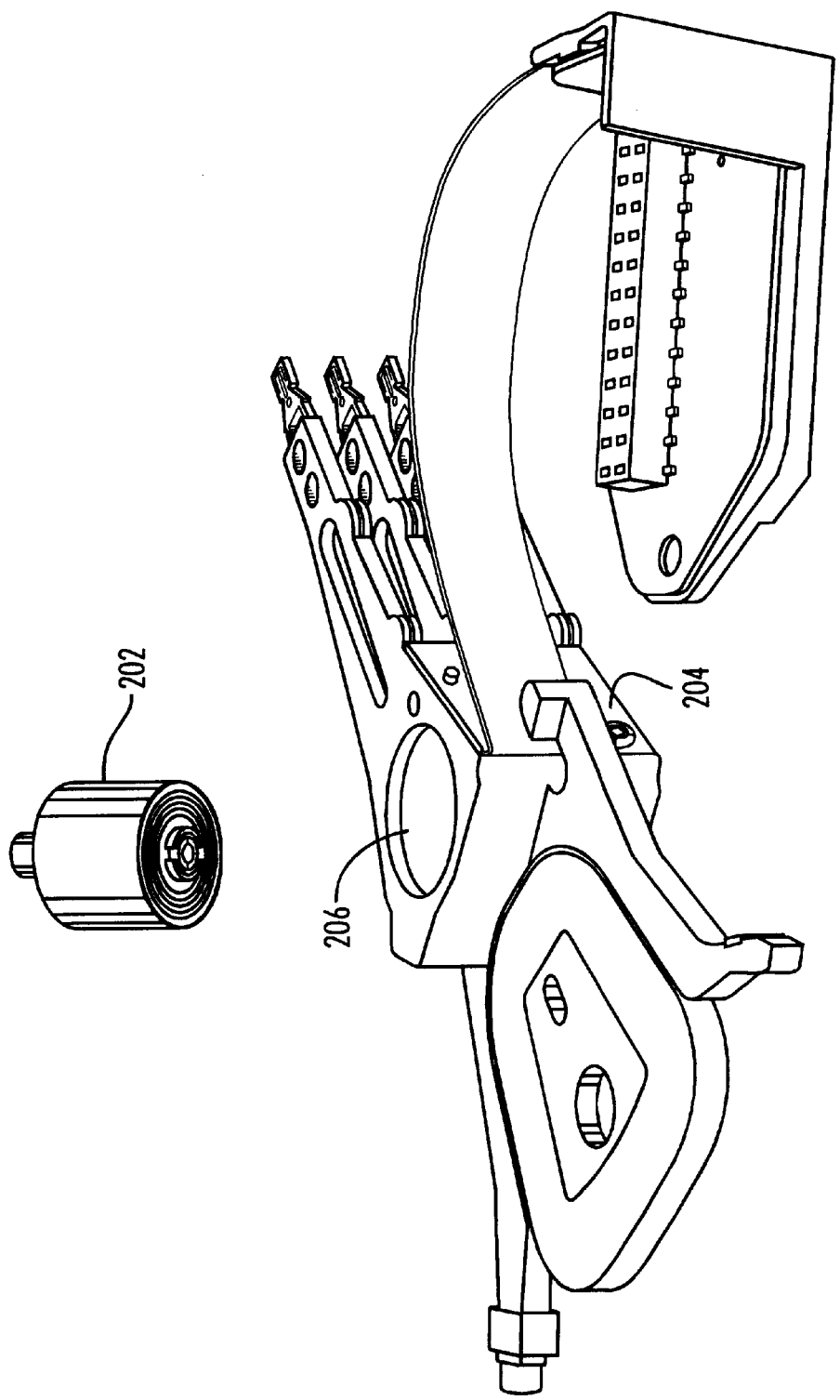
FIG. 2 illustrates an exemplary pivot bearing and actuator assembly used to implement a preferred embodiment of the present invention.

According to an embodiment of the invention, a pivot cartridge assembly has a pivot bearing 202 and an actuator assembly 204, as represented in FIG. 2. The actuator assembly 204 has an aperture 206 for receiving the pivot bearing 202. A preferred embodiment of the present invention involves tightly coupling the pivot bearing 202 to the actuator assembly 204, thus preventing pivot bearing vibration during the operation of the disc drive.

According to an aspect of the invention, the actuator assembly 204 is heated until the aperture 206 expands (due to normal thermodynamic expansion principles) to accommodate the pivot bearing 202. When the actuator assembly 204 cools, the aperture 206 thermodynamically contracts and constricts around the pivot bearing 202. In relation to the actuator assembly 204, the pivot bearing 202 is locked in a fixed position. The actuator assembly 204 may cool naturally or it may be cooled artificially. In the preferred embodiment of the invention, the actuator assembly 204 is made of aluminum. Other embodiments may employ any suitable material that thermodynamically expands when heated and contracts when cooled.

In operation, the actuator assembly 204 is selectively moved between track positions at a relative high rate of speed. Decreased track spacing is necessary to increase the areal bit density of the disc drive. This requirement is met by increasing the bandwidth of the actuator system, which reduces the off track error of the actuator system. The natural frequencies of the actuator system must be significantly higher than the bandwidth for servo system stability.

Figure 3:
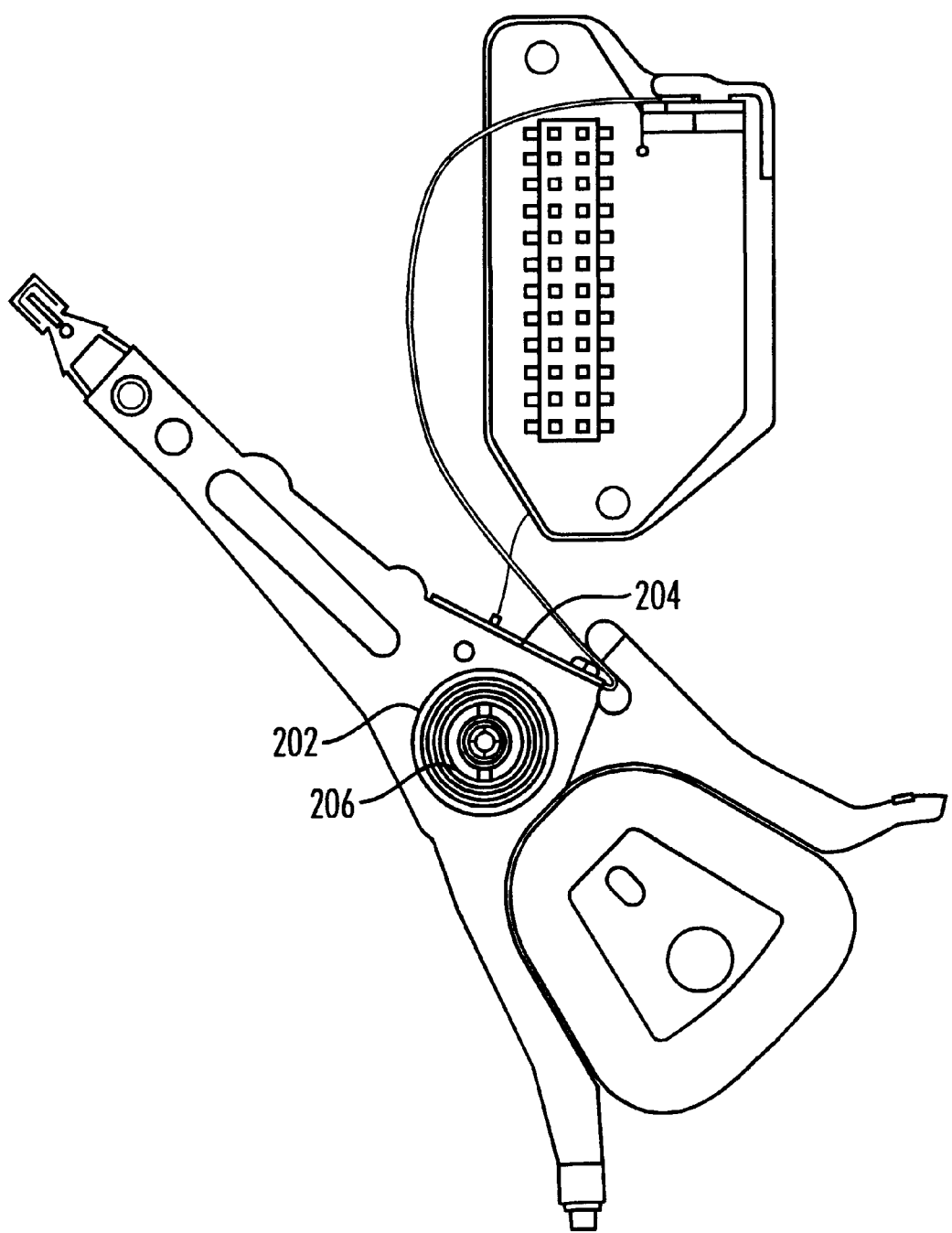
FIG. 3 illustrates a top view of a pivot bearing inserted into an aperture of the actuator assembly according to an embodiment of the present invention.

FIG. 3 shows a top view of the inserted pivot bearing 202 and the actuator assembly 204. During disc drive operation, the outer race of the pivot bearing 202 is stationary relative to the actuator assembly 204, and the pivot cartridge assembly behaves as a rigid single unit. Because the pivot cartridge assembly is rigidly coupled, in effect, as a unitary structure, its natural frequency of vibration can be greater than the natural frequency of a multiple element structure as described in the background section. This increased natural frequency allows a servo to move the actuator arms with reduced off track error. As a result, the increased natural frequency can improve the seek time of a disc drive.

Figure 4:
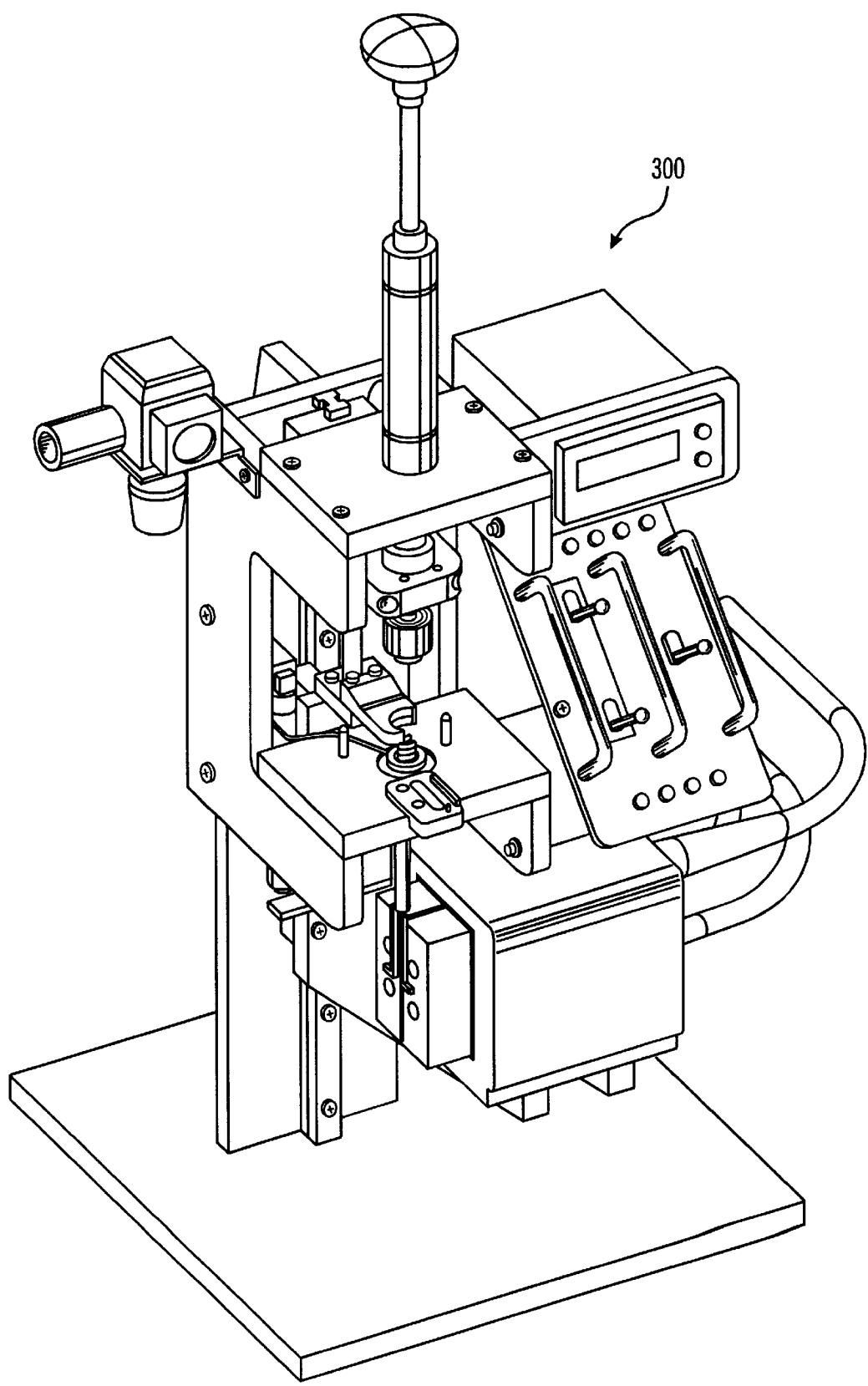
FIGS. 4–5 illustrates a machine used to insert the pivot bearing into the aperture of the actuator assembly according to an alternative embodiment of the present invention.

FIG. 4 illustrates a pivot cartridge install fixture 300 ("the fixture"). In the preferred embodiment of the invention, the fixture 300 is used to heat the actuator assembly 204 and insert the pivot bearing 202 into the aperture 206 of the actuator assembly 204.

Figure 5:
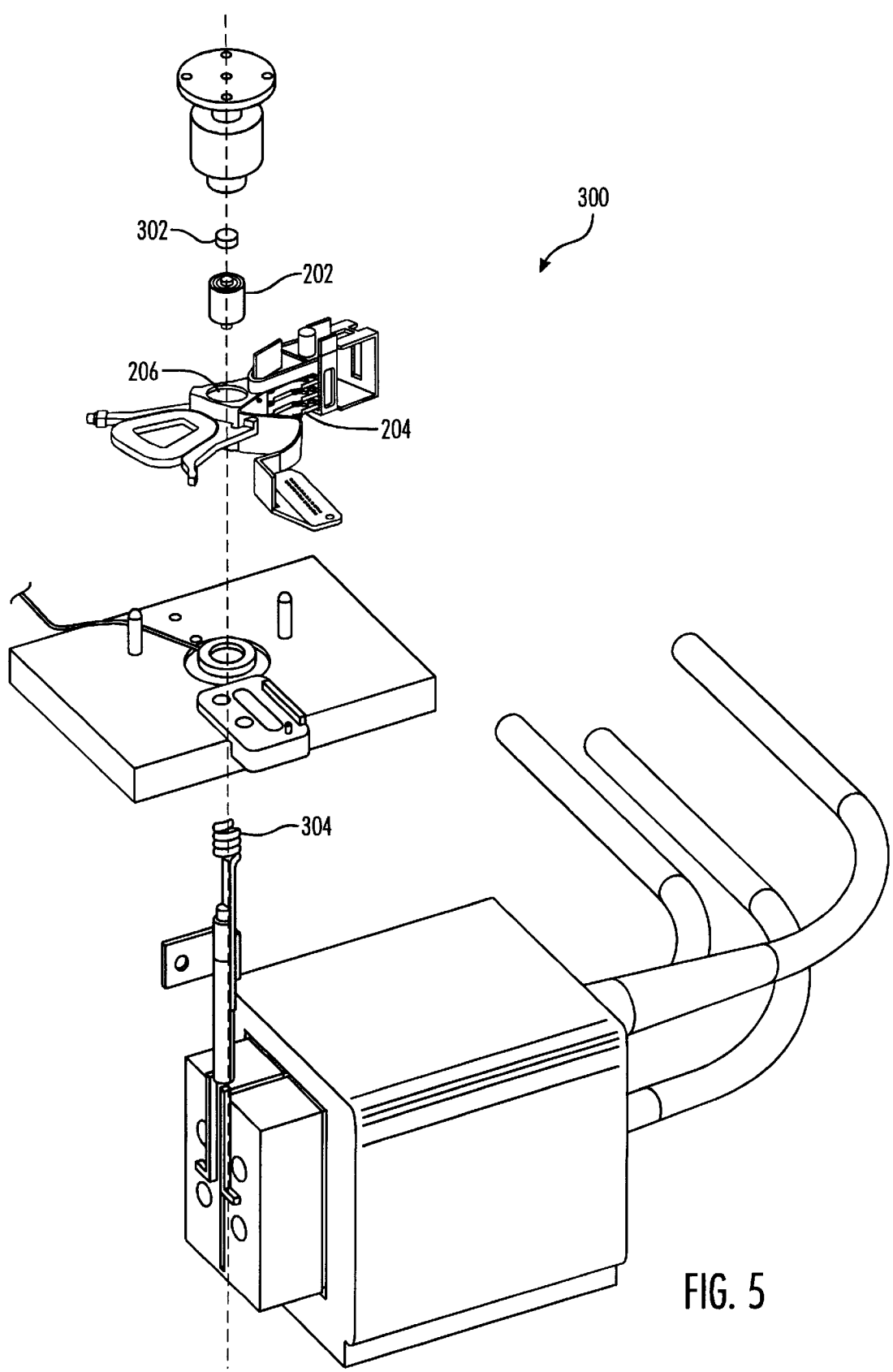

Before inserting the pivot bearing 202 into the actuator assembly 204, the fixture 300, locates the two elements away from each other. FIG. 5 represents the fixture 300 positioning the actuator assembly 204 and clamping it in place. A magnet 302 on the fixture 300 holds the pivot bearing 202 above the actuator assembly 204, such that the pivot bearing 202 does not contact the actuator assembly 204. The generally cylindrical pivot bearing 202 is axially aligned with the actuator assembly 204 so that the pivot bearing 202 can be inserted substantially straight into the cylindrical aperture 206 of the assembly 204. A radio frequency induction coil 304 on the fixture 300 is located beneath the actuator assembly 204, contacting the bottom surface of the actuator assembly 204. The radio frequency induction coil 304 heats the actuator assembly 204 until the aperture 206 expands to accommodate the pivot bearing 202. The fixture 300 retracts the radio frequency induction coil 304 away from actuator assembly's 204 bottom surface. The fixture 300 then inserts the pivot bearing 202 into the aperture 206 of the actuator assembly 204. The actuator assembly 204 is then allowed to cool naturally. During the cooling process, the actuator assembly 204 thermodynamically contracts and constricts around the pivot bearing 202. In an alternative embodiment of the invention, artificial cooling techniques are used.

Conclusion

The specification discloses descriptions of preferred embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the preferred embodiments of the present invention.

A preferred method, apparatus, and system for constructing a pivot cartridge assembly for use with a hard disc drive system are disclosed in the specification. The method involves the following steps. A pivot bearing 202 and an actuator assembly 204 are provided. The actuator assembly 204 has an aperture 206 for receiving the pivot bearing 202. The actuator assembly 204 is heated until the aperture 206 of the actuator assembly 204 expands to accommodate the pivot bearing 202. The pivot bearing 202 is inserted into the aperture 206 of the heated actuator assembly 204. In an alternative embodiment of the present invention, the step of providing an actuator assembly 204 comprises providing an aluminum block actuator assembly 204. A further embodiment involves the additional step of cooling the heated actuator assembly 204 until the aperture 206 of the heated actuator assembly 204 thermodynamically contracts and constricts around the inserted pivot bearing 202. In another embodiment, the step of inserting involves using a machine to insert the pivot bearing 202 into the aperture 206 of the heated actuator assembly 204. The machine aligns the pivot bearing 202 with the aperture 206 of the actuator assembly 204. The aperture 206 has a central axis. The pivot bearing 202 is inserted substantially parallel to the central axis of the aperture 206.

The apparatus involves a pivot cartridge assembly for use with a hard disc drive system. The pivot cartridge assembly has a pivot bearing 202 and an actuator assembly 204.

The actuator assembly 204 has an aperture 206 for receiving the pivot bearing 202. It also has a means for heating the actuator assembly 204 until the aperture 206 of the actuator assembly 204 expands to accommodate the pivot bearing 202, and a means for inserting the pivot bearing 202 into the aperture 206 of the heated actuator assembly 204. In an alternative embodiment of the present invention, the actuator assembly 204 is an aluminum block actuator assembly 204. A further embodiment has a means for cooling the heated actuator assembly 204 until the aperture 206 of the heated actuator assembly 204 thermodynamically contracts and constricts around the inserted pivot bearing 202. In another embodiment, the means for inserting the pivot bearing 202 into the aperture 206 of the heated actuator assembly 204 is a machine. The machine aligns the pivot bearing 202 with the aperture 206 of the actuator assembly 204. The aperture 206 has a central axis. The pivot bearing 202 is inserted substantially parallel to the central axis of the aperture 206.

The system involves at least one recording disc and a pivot cartridge assembly. The pivot cartridge assembly has at least one arm and it is disposed adjacent to the recording disc. A head is disposed on each pivot cartridge assembly arm. The pivot cartridge assembly has a pivot bearing 202 and an actuator assembly 204. The actuator assembly 204 has an aperture 206 for receiving the pivot bearing 202. It also has a means for heating the actuator assembly 204 until the aperture 206 of the actuator assembly 204 expands to accommodate the pivot bearing 202, and a means for inserting the pivot bearing 202 into the aperture 206 of the heated actuator assembly 204. In an alternative embodiment of the present invention, the actuator assembly 204 is an aluminum block actuator assembly 204. A further embodiment has a means for cooling the heated actuator assembly 204 until the aperture 206 of the heated actuator assembly 204 thermodynamically contracts and constricts around the inserted pivot bearing 202. In another embodiment, the means for inserting the pivot bearing 202 into the aperture 206 of the heated actuator assembly 204 is a machine. The machine aligns the pivot bearing 202 with the aperture 206 of the actuator assembly 204. The aperture 206 has a central axis. The pivot bearing 202 is inserted substantially parallel to the central axis of the aperture 206.

An alternative system involves a plurality of recording discs supported on a hub. The hub is adjacent to a plurality of heads. The alternative system also has a means for securing the discs to the hub.

What is claimed:

1. A method for constructing a pivot cartridge assembly for use with a disc drive system, comprising the steps of:
   (a) providing a pivot bearing;
   (b) providing an actuator assembly, wherein the actuator assembly has an aperture for receiving the pivot bearing;
   (c) heating the actuator assembly until the aperture of the actuator assembly expands to accommodate the pivot bearing; and
   (d) inserting the pivot bearing into the aperture of the heated actuator assembly.

2. The method of claim 1, wherein the provided step (b) comprises providing an aluminum block actuator assembly.

3. The method of claim 1, wherein the method further comprises a step (e) of cooling the heated actuator assembly until the aperture of the heated actuator assembly thermodynamically contracts and constricts around the inserted pivot bearing.

4. The method of claim 1, wherein the inserting step (d) comprises using a machine to insert the pivot bearing into the aperture of the heated actuator assembly.

5. The method of claim 4, wherein the inserting step (d) comprises aligning the pivot bearing with the aperture of the actuator assembly, wherein the aperture has a central axis, and the pivot bearing is inserted substantially parallel to the central axis of the aperture.

6. A method of assembling a pivot bearing assembly for use in a disc drive, the pivot bearing assembly including a pivot bearing in an actuator assembly wherein the actuator assembly has a pivot portion having an aperture therein about a pivot axis receiving the pivot bearing, the method comprising the steps of:
   a) providing a cylindrical pivot bearing having an outer diameter greater than a diameter of the aperture in the pivot portion;
   b) heating the pivot portion of the actuator assembly to expand the diameter of the aperture in the pivot portion sufficient to receive the pivot bearing within the aperture;
   c) axially aligning the cylindrical pivot bearing with the pivot axis of the actuator assembly;
   d) axially inserting the pivot bearing within the aperture; and
   e) cooling the pivot portion of the actuator assembly to shrink the aperture to apply a constrictive force to the pivot bearing to fasten the pivot bearing and the pivot portion of the actuator assembly together.

7. The method according to claim 6 wherein the heating step (b) comprises the steps of:
   (b)(i) placing the actuator assembly in a fixture;
   (b)(ii) contacting the actuator assembly with a radio frequency induction coil; and
   (b)(iii) energizing the coil to heat the pivot portion sufficient to expand the diameter of the aperture sufficient to receive the pivot bearing within the aperture.

8. The method according to claim 6 wherein the aligning step (c) comprises the steps of:
   (c)(i) positioning the pivot bearing in a fixture in axial alignment with the pivot portion of the actuator assembly; and
   (c)(ii) aligning the pivot bearing with the axis of aperture in the pivot portion of the actuator assembly.

9. A method of assembling a pivot bearing assembly for use in a disc drive, the pivot bearing assembly including a pivot bearing and an actuator assembly wherein the actuator assembly has a pivot portion having an aperture therein about a pivot axis, the method comprising the steps of:
   (a) providing a cylindrical pivot bearing having an outer diameter greater than a diameter of the aperture in the pivot portion;
   (b) placing the actuator assembly in a cartridge install fixture;
   (c) positioning the pivot bearing in the fixture spaced from the pivot portion of the actuator assembly;
   (d) aligning the pivot bearing with the axis of the aperture in the pivot portion of the actuator assembly;
   (e) contacting the actuator assembly with a radio frequency induction coil; and
   (f) energizing the coil to heat the pivot portion sufficient to expand the diameter of the aperture sufficient to receive the pivot bearing within the aperture;
   (g) axially inserting the pivot bearing within the aperture; and
   (h) cooling the pivot portion to shrink the aperture to fasten the pivot bearing and the pivot portion of the actuator assembly together.

* * * * *